United States Patent [19]
Stritzke

[11] Patent Number: 4,582,674
[45] Date of Patent: Apr. 15, 1986

[54] DEVICE FOR EVACUATING AND FILLING FINAL STORAGE CONTAINERS FOR RADIOACTIVE MATERIALS

[75] Inventor: Detlef Stritzke, Mol, Belgium

[73] Assignee: Deutsche Gesellschaft für Wiederaufarbeitung von Kernbrennstoffen mbH, Fed. Rep. of Germany

[21] Appl. No.: 343,827

[22] Filed: Jan. 29, 1982

[30] Foreign Application Priority Data

Feb. 7, 1981 [DE] Fed. Rep. of Germany ....... 3104366

[51] Int. Cl.[4] .......................... C09K 3/00; C09K 11/04
[52] U.S. Cl. .................................... 376/272; 252/628; 252/629
[58] Field of Search .......................... 65/124, 165, 2 B; 252/628, 629; 250/506.1; 376/272

[56] References Cited

U.S. PATENT DOCUMENTS

| | | | |
|---|---|---|---|
| 4,115,311 | 9/1978 | Sump | 252/629 |
| 4,234,449 | 11/1982 | Wolsow et al. | 252/629 |
| 4,326,918 | 4/1982 | Lapides | 252/629 |
| 4,341,547 | 7/1982 | Heimerl | 65/124 |
| 4,404,129 | 9/1983 | Penberthy et al. | 252/629 |

FOREIGN PATENT DOCUMENTS

| | | | |
|---|---|---|---|
| 0044692 | 1/1982 | European Pat. Off. | 252/629 |

*Primary Examiner*—Sal Cangialosi
*Attorney, Agent, or Firm*—Allegretti, Newitt, Witcoff & McAndrews, Ltd.

[57] ABSTRACT

A device for evacuating, filling and closing final storage containers for radioactive materials mixed with molten glass, comprising a suction pipe connected to the container, a meltable closure for said pipe and a closable evacuation connection fitting mounting in said meltable closure. The container is evacuated through the fitting whereupon the fitting is sealed closed to preserve the vacuum. When the suction pipe is dipped into the molten glass to fill the container, the closure melts and with the glass is sucked into the container.

In another form the device also includes a protective sleeve surrounding the fitting, closed at its outer end with a meltable plate which also serves as a heat radiation shield. The shield prevents premature melting of the meltable closure, i.e. melting from the heat in the glass furnace prior to immersion of the suction pipe in the molten glass.

The invention also includes a closure for the filled container which may be soldered at its periphery to the container wall by induction heating to seal the container.

2 Claims, 3 Drawing Figures

DEVICE FOR EVACUATING AND FILLING FINAL STORAGE CONTAINERS FOR RADIOACTIVE MATERIALS

The invention relates to a device for evacuating, filling and closing final storage containers for radioactive materials. Such a device was proposed before in German patent application P No. 29 27 795.0-33, corresponding to U.S. Pat. No. 4,341,547. The device includes a suction pipe connected vacuum-tight to the final storage container. The suction pipe is closed on the suction side by a melt-in closure of glass. Subsequently the container, including the suction pipe, is evacuated and the suction pipe is dipped into the glass melt of the melting furnace which melt contains the radioactive material. The suction pipe closure melts at the temperature of the melt in the furnace and the melt is sucked in by the evacuated container until the container is filled. In this disclosure the evacuation of the container takes place by way of a Leibold flange which is welded onto the upper cover of the container. However, when operating with radioactive material the evacuation cannot take place directly by way of the Leibold flange. For reasons of safety, the container must be equipped with a valve which becomes contaminated and this leads to additional radioactive secondary waste. Furthermore, the cover must be welded gas-tight all around and may not outwardly deviate from a prescribed geometrical form.

German patent application P No. 29 27 795.0-33 discloses attaching an evacuation connection fitting to the bottom of the container next to the suction pipe but separated from it. The application does not teach the manner of closing the evacuation connection fitting after the evacuating operation. Neither does it teach materials suitable for that purpose. At the point where the evacuation connection fitting joins the container, high temperatures around approximately 1000° C.–1200° C. occur during the filling operation. Therefore only materials having a higher melting point are suited in connection with this method. After the evacuation, the evacuation connection fitting must be closed. Because of the high temperatures, actually only cold pressure welding is a suitable procedure for closing the fitting. Hence a material with good cold pressure properties must be used for the evacuation connection fitting for instance, LC nickel 99.9. It is disadvantageous that the cold pressure welding, and the separation of the fitting after the completed filling of the container, require considerable force, especially if nickel is used as the material for the evacuation connection fitting. For these operations tools have to be employed which, in order to be applied, require a relatively large space between the edge of the final storage container and the suction pipe. Such a space does not exist. An extension of the evacuation connection fitting beyond the edge of the container is no solution either because it will prevent the cover from making a vacuum-tight closure with the container.

After the final storage container has been filled, it must be closed gas-tight, which is usually done by means of a cover. For a container filled by way of a bottom outlet system or an overflow system or for a Vitromet container, the cover has substantially the same form and is inserted into the filled container from above. If the filling of the container takes place according to the suction method, the cover is put in from below. Then, as a rule, it has a different shape. It is the purpose of the cover to seal the remaining gas space between the surface of the radioactive glass and the cover against the atmosphere, and to produce a mechanically strong connection between the cover and the container so that the cover will carry the weight of the filled container.

The object of the present invention consists therefore in developing a device of the kind described in which the problems mentioned are eliminated, and the filling and closing operations can be carried out in a simple and safe manner. These objects are achieved by the measures set forth in the following specification.

According to the invention, the evacuation connection fitting is designed integrally with the closure for the suction pipe. The evacuation connection fitting is attached to the suction pipe and protrudes from it. This design guarantees sufficient space for applying a tool for the cold-welding required to close the end of the evacuation connection fitting after the evacuating operation and to separate the end of the fitting. After the filling operation, the suction pipe and its closure, together with the evacuation connection fitting, are disposed inside the final storage container so that the closing of the container after filling can be carried out very easily by means of a cover. Since the evacuation connection fitting is so-to-speak a component of the closure for the suction pipe that can be melted within the pipe, there is no need for an additional connection piece, and thus the number of weak spots on the container is reduced.

In a preferred form of the invention, the evacuation connection fitting protrudes from the end of the suction tube. Thus an especially simple handling of the fitting is possible. The applying of tools no longer causes any difficulties.

According to another feature of the invention the closure for the suction pipe comprises a metal plate inside the pipe at the end thereof. The plate is mechanically and thermally sturdier than the glass/metal suction pipe closures previously used. The connection fitting is welded or soldered to the margin of an opening in the plate which guarantees good sealing for the evacuation process.

In an alternate form of the invention, the connection fitting extends above the plate into the suction pipe and is welded or soldered to the internal wall of the pipe. This construction provides a sturdier fastening of the evacuation connection fitting.

The evacuation connection fitting may be made from aluminum or similar low-melting metal to assure that the evacuation connection fitting will melt during the dipping of the suction pipe into the glass melt so that the filling is not impeded by the evacuation connection fitting.

A sleeve may be connected to the end of the suction pipe to surround the connection fitting for protection of the closed end of the fitting against mechanical damage. The sleeve may be screwed, welded, soldered or pressed into the end of the suction pipe, and may be of aluminum so that it will melt with the connection fitting and will be sucked into the container during the fitting operation. Thereby no additional radioactive secondary waste occurs, which would have to be eliminated separately. Also the covering of the container can take place without obstruction.

In another form of the invention, a plate closure is welded over the end of the sleeve to further increase protection of the fitting against mechanical damage.

The plate closure also prevents during the dipping of the suction pipe into the hot melting furnace, premature melting of the relatively thin-walled cold-welded area of the fitting.

Openings may be provided through the wall of the sleeve to relieve excess pressure within the space between the closure in the end of the suction pipe and the surface of the glass melt during the dipping of the suction pipe into the glass melt.

It should also be pointed out that good vacuum tightness is guaranteed by the soldered, welded and especially cold-welded metel connections as defined in the invention. Moreover, these connections permit an easy later repair of possible leaks.

Since the entire device consists only of metal, defects and deficiencies based on marked differences of material are practically excluded and thereby the safety during the filling and the closing of the final storage container is improved.

For containers, which are filled by means of the suction method, it is not necessary to turn the container around for covering. By the design as defined in the invention the gas-tight closing of the container is accomplished with a minimum of operations. Remote-operated or automatically controlled welding stations in the so-called "hot range" are no longer necessary. The soldered area obtained by this further development is mechanically strong and safe. In the active range there is only a deposit table and a heating spiral or copper coil. A generator for induction heating is disposed outside the treatment cell. Mechanically moving parts as previously used in connection with the welding station are no longer necessary.

According to the invention, the periphery of the cover adjacent the inside wall of the container has recesses containing solder which is melted by an induction heating coil surrounding the joint. Gold plating of the contact surfaces may be provided in the gap between cover and container. Thereby the use of fluxing agents is minimized and the time for the soldering process can be shortened considerably.

The invention will be explained now by means of the attached drawings in which embodiments are illustrated.

Figure 1:
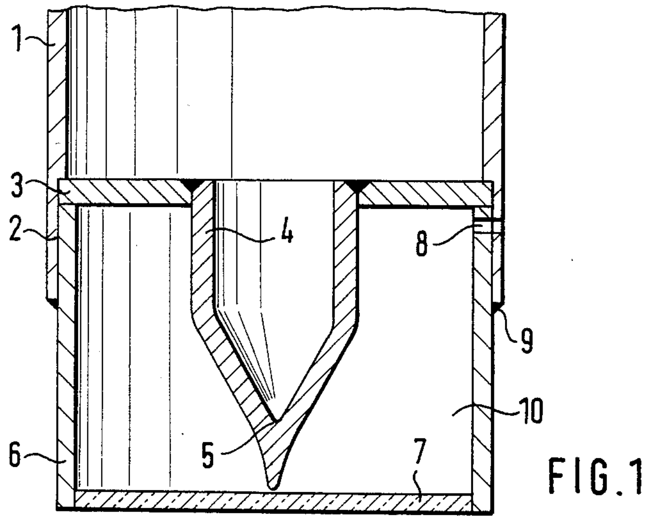
FIG. 1 is a sectional view through a suction pipe showing a first embodiment of the invention for evacuating and closing a final storage container.

In FIG. 1 a suction pipe of high-grade steel is provided with recess 2 in the end thereof which is approximately 2 cm deep. A circular plate 3 is seated within the recess 2, which may be made of aluminum. The plate may be fastened to the pipe for instance, by soldering using a special solder and a fluxing agent. A thick-walled evacuation connection fitting 4 in the form of a short length of aluminum tubing, is welded concentrically into the aluminum cover plate 3, and extends downwardly from closure plate 3. The final storage container (not illustrated), to which the suction pipe 1 is connected, is pumped empty through the evacuation connection fitting 4. After evacuation and subsequent pressurizing to a specified residual gas pressure with a dry gas, the evacuation connection piece is closed off. For this purpose, hydraulically-operated squeezing pliers may be used which in one operation presses the evacuation connection tube together at 5 and cuts off the lower protruding part. The strong compression pressure of the pliers welds the aluminum together as indicated at 5 so that the container is closed vacuum tight.

A nipple or sleeve 6 with a closure 7 at the bottom thereof, for instance, in the form of a heat radiation shield of aluminum or possibly of glass slides into the recess 2, against the underside of the closure 3. The sleeve has an exhaust opening 8. It is secured against dropping out by at least three welding spots 9. The sleeve 6 can also be screwed or pressed into the suction pipe recess 2. The exhaust opening 8 aligns with a corresponding opening in the suction pipe 1 and permits air to escape from the space 10 within the sleeve between the closing plates 3 and 7 during the dipping of the suction pipe into the liquid glass and during the melting of the closure 7.

The exhaust opening can be omitted in case of a short sleeve 6. If no exhaust opening 8 is present, the gas volume in space 10 at about 1200° is added to the residual gas volume in the container and causes a slight pressure rise therein.

As meltable material for the plate 3 and the evacuation connection fitting 5 brass or copper can be used in place of aluminum; brass for the plate 3 and copper for the evacuation connection fitting 5. With this combination of materials, the closure 7 (heat radiation shield) of the sleeve 6 is not absolutely necessary since copper melts at a considerably higher temperature than aluminum.

However, it is recommended to attach the sleeve 6 after squeezing off the evacuation fitting of copper in order to protect the cold-welded spot 5 against mechanical damage.

Figure 2:
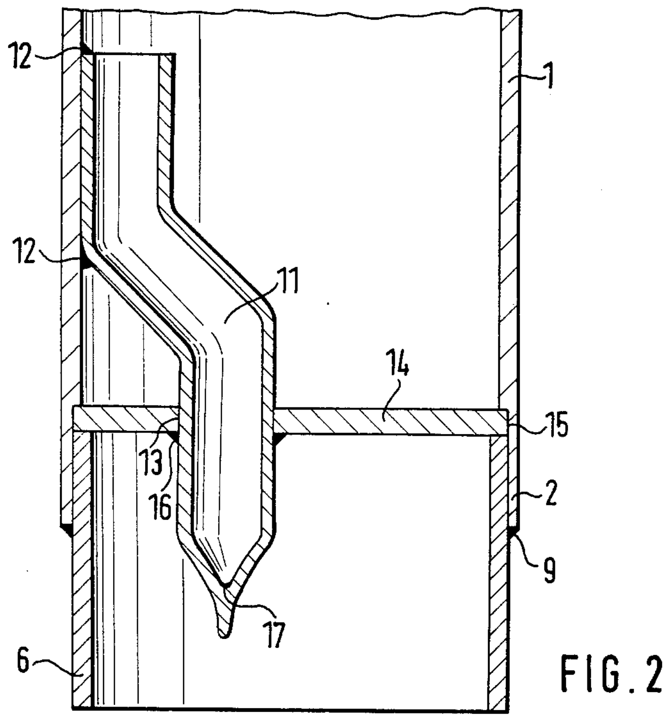
FIG. 2 is a similar view illustrating a second embodiment of this device.

FIG. 2 shows a bent evacuation connection fitting 11 which is secured tightly inside the suction pipe on the container side at 12 by welding or soldering with high-temperature solder. The evacuation connection fitting 11 is located in an eccentric bore 13 in metal closure plate 14. The plate may be made of brass or aluminum. As described before in connection with FIG. 1, the metal plate 14 is fastened in a suction pipe recess 15. The evacuation connection fitting 11 can be made of nickel, for instance, LC nickel. One obtains the vacuum-tight closure between the nickel evacuation connection fitting 11 and the metal plate 14 by soldering the fitting to the metal plate 14 at joint 16. The solder used has a lower melting point than the solder used for the soldering to the metal plate 14 at its periphery 15. The following operations are then the same ones described in connection with FIG. 1. The sleeve 6 serves to protect the pinched, cold-welded end 17 of the fitting 11.

The manner of operation of the devices according to FIG. 1 and 2 is as follows (with the presupposition that the evacuation of the container has taken place and the evacuation connection fitting is closed vacuum tight):

If the end of the suction pipe 1 is dipped into the glass melt (not illustrated), the closure 7 (heat radiation shield) melts first and the air from the space 10 escapes into the melt by way of the exhaust opening 8. Immediately afterwards the sleeve 6 and the closure plate 3 melt. By reason of the vacuum in the container and the sudden upward flow of the molten glass, the entire molten aluminum or brass or copper is also sucked up into the container. In the embodiment of FIG. 2 only the metal closure 14 melts. Because of the high melting point of nickel (1453° C.), the evacuation connection fitting 11 remains in the position shown in FIG. 2 from the beginning to the end of the filling operation.

Figure 3:
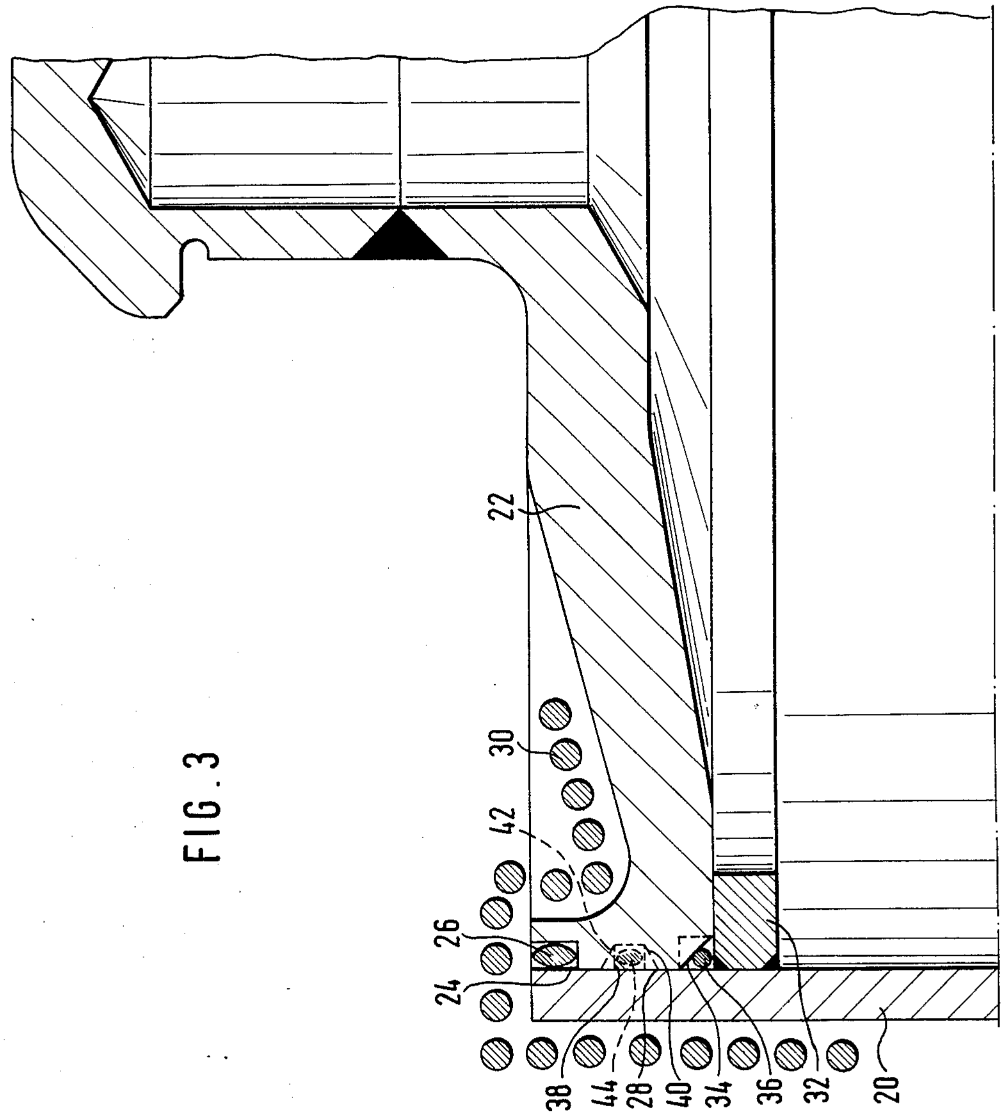
FIG. 3 is a half sectional view through an end of a cylindrical container showing a cover construction for gas-tight closing a filled final storage.

FIG. 3 shows a final storage container 20 having an annular flange or a ring 32 welded in the upper end as a stop. A cover 22 has a circumferential groove 24 which holds a shaped solder part 26 and a fluxing agent, or a shaped solder part surrounded by a fluxing agent. The contact surfaces in the gap between the cover and the container are preferably gold-plated electrolytically in order to minimize the consumption of fluxing agent and thereby shorten the time for the soldering process.

The solder, the cover and the container are inductively heated in the upper zone up to the working temperature of the solder by means of a copper coil concentrically arranged around the contact surface of the cover and the container. It is important with this arrangement that the cover be heated first to expand and press against the container. By an appropriate arrangement of the copper coil, the heat distribution between the cover and the container can be controlled. It is most favorable for the soldering process if the cover and the container surrounding the solder heat equally fast. This cover system can be employed for all types of containers.

For containers which are filled by means of the suction method, the cover is preferably put in from below so that during the turning of the container glass residues will not contaminate the environment. In this case, the cover 22 has a circular recess 34 on the cover edge opposite the recess 24. This recess 34 can be sloped—as shown—or can have the rectangular shape which is drawn by broken lines, similar to the recess 24. For covers which are put in from below, the recess 24 may be omitted. The measures for heating the container parts and cover parts around the contact surfaces are the same as those described previously for the melting of the shaped solder part 26.

In the surface of the cover 22 bounding the gap 23 additional recesses 38 may be provided. These recesses can have the shape of a rectangular annular groove or can be provided with a surface 40 inclined in the direction of flow of the solder when covering from above or 42 when covering from below. Shaped solder parts 44 are put into this recess or recesses.

What is claimed is:

1. A device for use in evacuating and filling a storage container with radioactive glass melt comprising
  a suction pipe in communication with the interior of said container for filling the container,
    said pipe being made from a material which has a melting point higher than the melting point of said melt,
  a closure means within said pipe,
    said closure means being made from a low-melting metal taken from the group comprising aluminum, brass, and copper,
  an evacuation connection fitting for evacuating the container and suction pipe,
    said fitting being mounted in sealed relation in said closure disposed at least partially within said suction pipe and having its end sealed by cold pressing.

2. A device for use in evacuating and filling a storage container with radioactive glass melt comprising
  a suction pipe in communication with the interior of said container for filling the container,
    said pipe being made from a material which has a melting point higher than the melting point of said melt,
  a closure means within said pipe,
    said closure means being made from a low-melting metal taken from the group comprising aluminum, brass, and copper,
  an evacuation connection fitting for evacuating the container and suction pipe,
    said fitting being mounted in sealed relation in said closure and protruding from said suction pipe,
    a sleeve protecting said fitting, and
    an opening through the wall of said sleeve to permit exhausting air therefrom.

* * * * *